United States Patent Office 3,266,643
Patented August 16, 1966

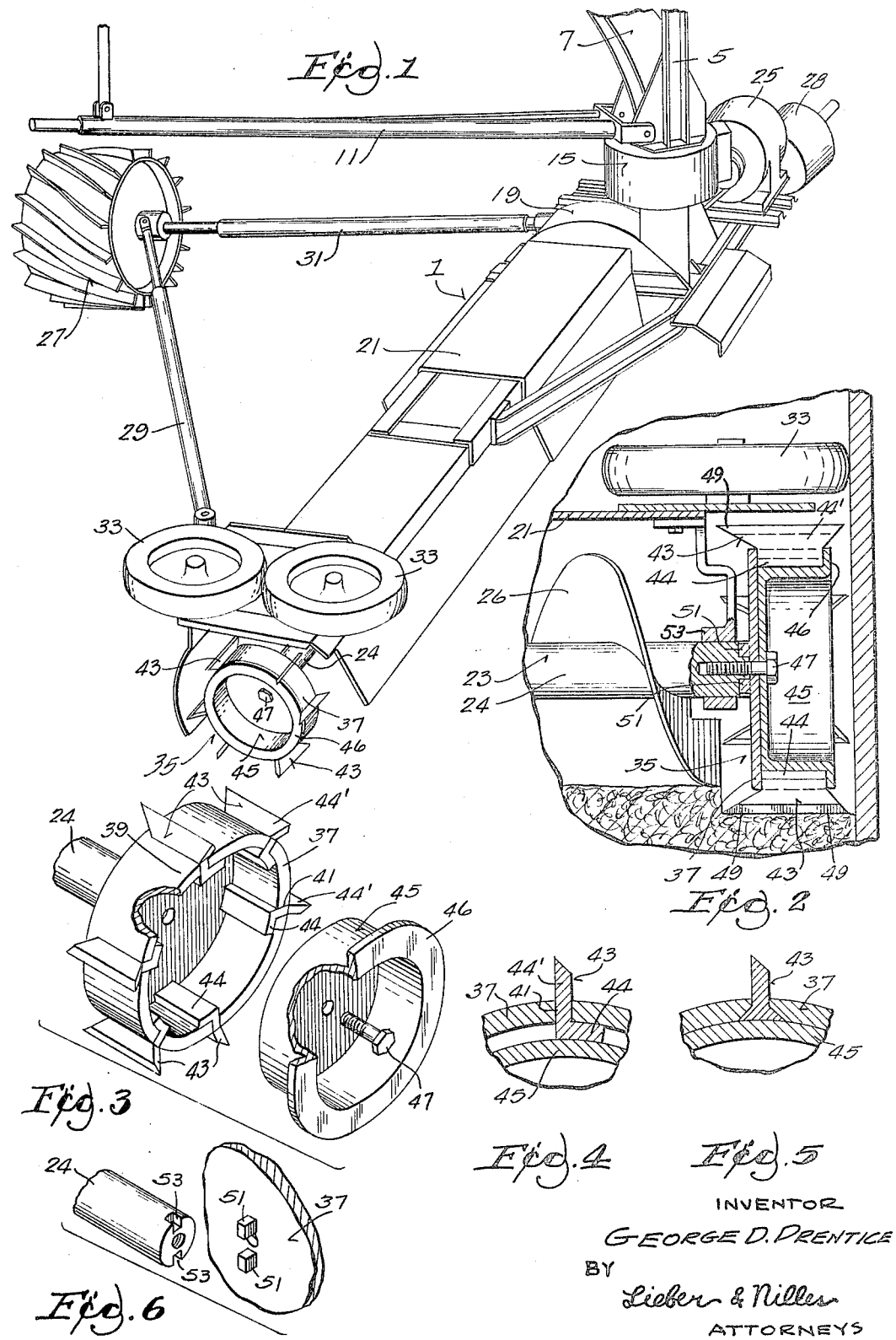

3,266,643
CUTTER WHEEL ASSEMBLAGE
George D. Prentice, Milwaukee, Wis., assignor to A. F. Klinzing Co., Inc., Milwaukee, Wis., a corporation of Wisconsin
Filed Dec. 21, 1964, Ser. No. 419,982
9 Claims. (Cl. 214—17)

This invention relates to improved cutting wheels of the type having removable or replaceable cutting teeth. Such cutting wheels may find application in silo unloaders as a device for removing silage adjacent the wall of the silo.

A primary object of this invention is to provide an improved cutting wheel having a plurality of radially projecting cutting teeth in which the teeth may be easily changed in the event of breakage or to accommodate different types of teeth, yet in which the teeth are firmly locked during cutting operations.

Another object of this invention is to provide an improved cutting wheel especialy adapted for use in connection with silo unloaders, but which may also find application wherever it is desired to provide a carrier member with radiating teeth or cutters.

A further object of this invention is to provide a cutting wheel which prevents a rim or rail of compacted or frozen silage from forming and interfering with proper operation of the unloader.

Still another object of the invention is to provide an improved cutting wheel assemblage of the type above indicated wherein the entire assembly may be readily secured to or removed from the end of a shaft.

The above and other objects of this invention are obtained by providing a dish-shaped, cup-like base with a plurality of slots in the annular wall or rim portion thereof through which extend a plurality of cutting teeth. The slots may be undercut if desired and the portions of the teeth in contact with the slots are L-shaped, T-shaped or dovetailed to position and hold the blades. A retaining member, also cup-like in shape, is mounted inside the base to wedge the teeth in the slots and retain them therein during a cutting operation. When employed in a silo unloader, the blade portion of the teeth may be axially extended to insure removing the silage from the wall of the silo and to prevent a rail of silage from forming between the cutting wheel and the conveying portion of the unloader.

The invention, both as to its structure and mode of operation, will be better understood by reference to the following specification and drawings, forming a part thereof, wherein;

FIGURE 1 shows a typical silo unloader provided with a cutting wheel of this invention;

FIGURE 2 is a fragmentary sectional view of the silo unloader showing the cutting wheel of the present invention in some detail;

FIGURE 3 is an exploded detail view of a preferred embodiment of the cutting wheel;

FIGURE 4 is a fragmentary section through the cutting wheel of FIGURE 3 showing one of the teeth locked in position;

FIGURE 5 is a similar view showing a somewhat modified cutting tooth, and;

FIGURE 6 is a view of the cutting wheel showing a means for attaching the wheel to a driving shaft.

Referring to FIGURE 1, there is shown therein, by way of illustration, a silo unloader of the type with which the cutting wheel of this invention may be advantageously employed. The unloader 1 is suspended from the top of the silo by cable which positions the unloader 1 in the center of the silo. A discharge spout 7 connected to frame 5 directs the unloaded silage into a chute on the side of the silo for delivery to ground level. Support member 11 assists the cable in positioning the unloader 1 and discharge spout 7 in the proper location of the silo. A collector ring housing 15 is mounted at the base of frame 5 and provides electric power to the rotating parts of the unloader from a cable (not shown) by means of collector rings and brushes contained therein. A blower 19 is mounted on collector ring housing 15 to propel the unloaded silage through discharge spout 7. The rotating parts of the unloader include a conveyor frame 21 pivotally connected to the collector ring housing 15 for rotation in a horizontal plane. Conveyor frame 21 supports an auger type conveyor 23, comprised of shaft 24 and spiral blade 26 which loosens the silage and transports it to the center of the silo as conveyor frame 21 rotates. Auger conveyor 23 is driven by motor 25. Rotary power to conveyor frame 21 is provided by a cleated wheel 27 fastened to frame 21 by support 29 and driven from motor 25 by shaft 31. Wheels 33 are provided at the outer end of conveyor frame 21 to facilitate the movement of the unloader past the silo walls during rotation. The counter weight 28 is mounted on the other end of the conveyor frame 21 to balance the rotating parts of the unloader on collector ring housing 15.

Cutting wheel 35 is mounted on the outer end of auger conveyor 23 adjacent the silo wall to loosen the silage near the wall. This is necessitated by the compaction of the silage against the wall during the loading and subsequent storage of the silage and, in winter, to freezing of the moist silage when cold penetrates the wall of the silo. Cutting wheel 35 is comprised of a cup-shaped base 37 affixed to the end of a driving shaft 24. The annular wall of base member 37 forms an axially extending rim 39. Rim 39 contains a plurality of outwardly open and circumferentially spaced slots 41 which may or may not be undercut as desired as illustrated in the alternate embodiments of FIGURES 4 and 5. A plurality of teeth 43 of L-shape or the like to provide root portions 44 and blade portions 44' adapted to extend through the slots 41 are provided. A cup-like retainer 45, peripherally coacting with the root portions 44 of the teeth 43 when received in the base member 37 retains the teeth 43 in their respective slots 41. Retainer 45 may also preferably have a radially extended edge flange 46 to prevent axial movement of the teeth 43. In some instances, it is also desirable for the teeth 43 to have the blade portions extended beyond their root portions so as to overhang the flange 56. Bolt 47 secures both base 37 and retainer 45 to shaft 24. As shown in FIGURE 6, base member 37 may be provided with projections 51 on the back side thereof which fit into mating grooves 53 on shaft 24 to assist bolt 47 in securing base 37 on shaft 24, and this construction permits ready application or removal of the cutting wheel assembly to or from the shaft.

Teeth 43, whether of L-shaped cross section as shown in FIGURES 3 and 4 or of generally T-shape with tapered edges as in FIGURE 5, may be exchanged or replaced by loosening bolt 47 and removing retainer 45. This allows teeth 43 to be slipped through, or removed from, slot 41. The blade portions of teeth 43 may be of any shape commensurate with the cutting operation desired, and the root portions may coact with the inner surface of the rim 39 of the base member 37 as in FIGURES 3 and 4, or they may be recessed in the rim 39 as in FIGURE 5.

In the case of a silo unloader, it is desirable to provide considerable overhang to the cutting blades as at 49 to insure that the silage is cleanly removed from the wall of the silo and to prevent a rail of silage from forming about the end bearing and between the cutting wheel and auger blade 26. Without such overhang, a rail of compacted silage could form in the area 49 and about the bearing 52 which would prevent the unloader from sinking into the silage and preventing the unloading thereof, and damage to the end bearing of the auger could also result. In this connection, it should also be noted that the hanger for the bearing 52 is provided with an offset intermediate the ends thereof. This permits the bearing 52 to be located within the overhanging portions 49 of the teeth 43 and the adjacent end of the auger 26 while permitting the teeth and auger to clear the hanger.

While the invention has been described in a specific embodiment and environment, it is understood that various modifications and alterations may be made to this invention, and it is intended to cover in the appended claims all such modifications as fall within the true scope and spirit of the invention.

Various modes of carrying out the invention are contemplated as being within the scope of the following claims particularly pointing out and distinctly claiming the subject matter which is regarded as the invention.

I claim:

1. A cutting wheel comprising:
   a base member having an axially extended rim and a slot extending inwardly from the outer edge of said rim;
   a cutting tooth extending through said slot and having a flanged root portion seated against the interior of said rim;
   a cup-shaped retainer mounted inside of said base member and having the annular wall thereof coacting with said root portion to retain said cutting tooth in said slot; and
   means to fasten said retainer within said base member to complete the assembly.

2. A cutting wheel according to claim 1, wherein the inner surface of the rim is undercut adjacent the slot to recess the root portion of the tooth.

3. A cutting wheel according to claim 2, wherein the root portion of the tooth is flanged so that the tooth is of L-shaped cross section.

4. A cutting wheel according to claim 2, wherein the root portion of the tooth is flanged along both sides thereof and the flanges are tapered.

5. A cutting wheel for mounting on a grooved shaft comprising:
   a base member having an axially extended rim and a plurality of slots extending inwardly from the outer edge of said rim, said base member being adapted to be mounted on the end of said shaft and having lateral projections for engagement with the grooves in said shaft to prevent slippage of the base member on said shaft;
   a plurality of cutting teeth extending through said slots and having root portions seated against the interior of said rim;
   a cup-shaped retainer mounted inside of said base member closely adjacent said rim and coacting with said root portions to retain said cutting teeth in said slots; and
   means to fasten said retainer within said base member.

6. A cutting wheel comprising:
   a base member having an axially extending rim and a plurality of slots extending inwardly from the outer edge of said rim;
   a plurality of cutting teeth extending through said slots and having flanged root portions seated against the interior of said rim;
   a cup-shaped retainer mounted inside of said base member closely adjacent said rim and coacting directly with said root portions, said retainer also having a flanged edge portion abutting the ends of said teeth, whereby said cutting teeth are retained in said slots; and
   means to fasten said retainer within said base member.

7. In a silo unloader, cutting wheel for loosening silage adjacent the wall of the silo comprising:
   a cup-like base member rotatably mounted on the outer end of said unloader and having the annular wall thereof provided with a plurality of outwardly open slots;
   a plurality of cutting teeth extending through said slots and provided with flanged root portions seated against the inner surface of annular wall;
   a cup-like retainer mounted inside said base with its wall coacting with said root portions to retain said cutting teeth in said slots; and
   means to detachably secure said retainer within said base.

8. The silo unloading cutting wheel of claim 7, wherein the blade portions of said cutting teeth are axially extended to overhang the root portions and insure complete loosening of the silage adjacent the silo wall.

9. The silo unloading cutting wheel of claim 7, wherein a bearing supported by an offset hanger is provided for supporting the unloader adjacent to the cup-like member, and the cutting teeth are extended axially to overhang the bearing.

References Cited by the Examiner

UNITED STATES PATENTS

| | | | |
|---|---|---|---|
| 1,621,256 | 3/1927 | Jones | 241—191 |
| 3,138,268 | 6/1964 | Buschbom | 214—17 |

GERALD M. FORLENZA, *Primary Examiner.*

R. G. SHERIDAN, *Assistant Examiner.*